(12) United States Patent  (10) Patent No.: US 7,540,306 B2
Matsuda et al.  (45) Date of Patent: Jun. 2, 2009

(54) PRESSURIZED GAS CHARGING METHOD (75) Inventors: Naoki Matsuda, Hyogo (JP); Masayuki Nakayasu, Hyogo (JP)

(73) Assignee: Daicel Chemical Industries, Ltd., Sakal-Shi, Osaka (JP)

( * ) Notice: Subject to any disclaimer, the term of this patent is extended or adjusted under 35 U.S.C. 154(b) by 313 days.

(21) Appl. No.: 11/352,311

(22) Filed: Feb. 13, 2006

(65) Prior Publication Data

US 2006/0201572 A1 Sep. 14, 2006

Related U.S. Application Data (60) Provisional application No. 60/654,089, filed on Feb. 18, 2005, provisional application No. 60/681,453, filed on May 17, 2005.

(30) Foreign Application Priority Data

Feb. 14, 2005 (JP) ............................. 2005-036039
May 13, 2005 (JP) ............................. 2005-140960

(51) Int. Cl.
    *B65B 1/04* (2006.01)
(52) U.S. Cl. ............................. 141/3; 141/67; 280/737; 53/403
(58) Field of Classification Search .................. 141/67, 141/1, 3; 280/736, 737; 53/79, 403
    See application file for complete search history.

(56) References Cited

U.S. PATENT DOCUMENTS 3,567,245 A * 3/1971 Ekstrom ...................... 280/737
3,773,353 A * 11/1973 Trowbridge et al. ......... 280/737
5,078,422 A * 1/1992 Hamilton et al. ............ 280/736

(Continued)

FOREIGN PATENT DOCUMENTS

JP 3666846 B2 4/2005

*Primary Examiner*—Timothy L Maust
*Assistant Examiner*—William McCalister
(74) *Attorney, Agent, or Firm*—Birch, Stewart, Kolasch & Birch, LLP (57) ABSTRACT

The present invention relates to a pressurized gas charging method of charging a gas into the interior of a gas generator which has a pressurized gas chamber having an outer shell formed by a pressurized gas chamber housing, a gas generating chamber having an outer shell formed by a gas generating chamber housing, being connected to an opening portion at one end of the pressurized gas chamber, a diffuser portion having a gas discharge port, being connected to an opening portion at the other end of the pressurized gas chamber, and no charging hole, for charging a pressurized gas, provided in the pressurized gas chamber housing before charging the pressurized gas, comprising:

a first step of connecting one of the gas generating chamber housing and the diffuser portion to the opening portion at one end of the pressurized gas chamber housing, which has opening portions at both ends, thereby sealing the opening portion;

a second step of disposing the gas generating chamber housing or the diffuser portion, that is not connected in the first step, in the vicinity of the opening portion at the other end of the pressurized gas chamber housing so as to form a gap serving as a gas charging hole;

a third step of charging pressurized gas through the gap up to a predetermined pressure; and a fourth step of connecting the unconnected gas generating chamber housing or diffuser portion to the pressurized gas chamber housing to seal the gap.

5 Claims, 5 Drawing Sheets

U.S. PATENT DOCUMENTS

| | | |
|---|---|---|
| 5,226,561 A | 7/1993 | Hamilton et al. |
| 5,290,060 A | 3/1994 | Smith |
| 5,836,610 A * | 11/1998 | Rink et al. .................. 280/736 |
| 5,845,461 A * | 12/1998 | Miller et al. .................. 53/403 |

* cited by examiner

PRESSURIZED GAS CHARGING METHOD

This nonprovisional application claims priority under 35 U.S.C. § 119(a) on Patent Applications No. 2005-36039 filed in Japan on Feb. 14, 2005 and Patent Applications No. 2005-140960 filed in Japan on May 13, 2005, and 35 U.S.C. § 119(e) on U.S. Provisional Applications No. 60/654,089 filed on Feb. 18, 2005, and No. 60/681,453 filed on 17 May 2005, which are incorporated by reference.

BACKGROUND OF THE INVENTION

1. Field of the Invention

The present invention relates to a method of charging gas into a gas generator that is for use in an air bag system or the like, which is installed in an automobile, for restraining passengers and protecting pedestrians.

2. Description of the Related Art

In view of obtaining clean generated gas, a gas generator using pressurized gas is preferable as a gas generator used to inflate an air bag. Known examples of gas generators which use pressurized gas include a stored gas type gas generator in which pressurized gas alone is disposed in the interior of a housing, and a hybrid gas generator which employs a solid explosive in addition to pressurized gas. Both types of gas generator typically employ a structure whereby gas outlets are sealed by a sealing plate in order to seal in the pressurized gas, and during gas discharge, the sealing plate is ruptured either directly or indirectly by a rupturing device.

These hybrid gas generators and stored gas generators have a pressurized bottle for storing pressurized gas, and gas is charged into the bottle at high pressure. In a known conventional charging method, pressurized gas is charged into the bottle through a charging hole formed in the bottle, whereupon a sealing pin fitted into the charging hole is welded to the charging hole to close the hole.

Known gas generator is disclosed in U.S. Pat. Nos. 5,226,561 and 5,290,060.

SUMMARY OF THE INVENTION

The present invention relates to a method of charging the interior of a gas generator with a pressurized gas, the gas generator having a pressurized gas chamber having a pressurized gas chamber housing charged with a pressurized gas therein, a gas generating chamber housing connected to a first opening portion of the pressurized gas chamber housing, and a diffuser portion, having a gas discharge port, being connected to a second opening portion of the pressurized gas chamber housing, no charging hole for charging a pressurized gas being provided in the pressurized gas chamber housing before charging the pressurized gas, comprising:

connecting one of the gas generating chamber housing and the diffuser portion to the first opening portion of the pressurized gas chamber housing and sealing the first opening portion;

disposing the gas generating chamber housing or the diffuser portion, that is not connected in the connecting step, in the vicinity of the second opening portion of the pressurized gas chamber housing so as to form a gap serving as a gas charging hole;

charging the pressurized gas through the gap up to a predetermined pressure; and attaching and fixing the unconnected gas generating chamber housing or diffuser portion to the pressurized gas chamber housing to seal the gap.

In other words, the present invention relates to a method of charging the interior of a gas generator with a pressurized gas, the gas generator having a pressurized gas chamber having an outer shell formed by a pressurized gas chamber housing, being charged with a pressurized gas therein, a gas generating chamber having an outer shell formed by a gas generating chamber housing, being connected to an opening portion at one end of the pressurized gas chamber and a diffuser portion having a gas discharge port, being connected to an opening portion at the other end of the pressurized gas chamber, no charging hole for charging a pressurized gas being provided in the pressurized gas chamber housing before charging the pressurized gas, comprising:

a first step of connecting one of the gas generating chamber housing and the diffuser portion to the opening portion at one end of the pressurized gas chamber housing, which has opening portions at both ends, thereby sealing the opening portion;

a second step of disposing the gas generating chamber housing or the diffuser portion, that is not connected in the first step, in the vicinity of the opening portion at the other end of the pressurized gas chamber housing so as to form a gap serving as a gas charging hole;

a third step of charging pressurized gas through the gap up to a predetermined pressure; and a fourth step of connecting the unconnected gas generating chamber housing or diffuser portion to the pressurized gas chamber housing to seal the gap.

The present invention further relates to a method of charging the interior of a gas generator with a pressurized gas, the gas generator having a pressurized gas chamber having a pressurized gas chamber housing, having one end open and an opposite end closed and being charged with a pressurized gas therein, and an ignition device accommodating chamber housing, connected to the opening portion of the pressurized gas chamber housing and being provided with a pressurized gas discharge port, no charging hole for charging a pressurized gas being provided in the pressurized gas chamber housing before charging the pressurized gas, comprising:

disposing the ignition device accommodating chamber housing in the vicinity of the opening portion of the pressurized gas chamber housing so as to form a gap serving as a gas charging hole;

charging the pressurized gas through the gap up to a predetermined pressure; and connecting the unconnected ignition device accommodating chamber housing to the pressurized gas chamber housing to seal the gap.

The present invention relates to a method of charging the interior of a gas generator with a pressurized gas, the gas generator having a pressurized gas chamber having a pressurized gas chamber housing charged with a pressurized gas therein, a gas generating chamber housing connected to a first opening portion of the pressurized gas chamber housing, and a diffuser portion having a gas charge port, being connected to a second opening portion of the pressurized gas chamber housing, no charging hole for charging a pressurized gas being provided in the pressurized gas chamber housing before charging the pressurized gas, comprising:

disposing an assembly formed by connecting one of the gas generating chamber housing and the diffuser portion to the first opening portion of the pressurized gas chamber housing, thereby sealing the first opening portion, in a sealed chamber to which a pressurized gas supply device is annexed;

raising the internal pressure of the sealed chamber to a predetermined pressure; and connecting the unconnected gas generating chamber housing or diffuser portion to the pressurized gas chamber housing to seal the opening portion.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 2(*a*) and (*b*) show illustrative views of a pressurized gas charging method;

DETAILED DESCRIPTION OF THE INVENTION

Demands have been made for reductions in the size and weight of gas generators installed in automobiles, and it is therefore important to reduce the number of components. Moreover, to achieve a reduction in manufacturing costs, it is necessary to simplify the assembly process.

The present invention further relates to a method of charging pressurized gas into a gas generator, in which the number of components is reduced and the process for assembling the gas generator using pressurized gas is simplified.

When the pressurized gas chamber housing and either the gas generating chamber housing or diffuser portion are used in this manner, the need to provide a gas charging hole and a process for sealing the gas charging hole can be eliminated, and therefore the number of components and operations can be reduced. Moreover, the operation for sealing the gap in the fourth step may be performed using a typical assembly line, with no need for an independent process to seal a gas charging hole, and hence the assembly process can be simplified.

Note that the numbers denoting steps such as the first step through fourth step in the present invention merely indicate the sequence of steps, and these step numbers do not signify specific processes. Further, each of the first through fourth steps may be independent steps, or may be combined into a single step or divided into two or more steps.

The present invention further relates to the pressurized gas charging method, wherein one of the gas generating chamber housing and the diffuser portion has, on a part thereof which serves as a joint portion with the pressurized gas chamber housing, a contact surface which contact with the pressurized gas chamber housing and a non-contact surface which does not contact with the pressurized gas chamber housing, the non-contact surface forming the gap for charging the pressurized gas in the third step.

The non-contact surface may be provided singly or in a plurality. The non-contact surface may be a groove (irregular surface or uneven surface) or the like provided on the joint portion of either the gas generating chamber housing or the diffuser portion or the joint portion of the pressurized gas chamber housing, or conversely, the non-contact surface may be a groove (irregular surface or uneven surface) provided on the pressurized gas chamber housing. The depth and width of the groove should be sufficient to allow the pressurized gas charging operation to be performed smoothly, and may be determined in consideration of the number of grooves.

Thus, the non-contact surface on the joint portion of the gas generating chamber housing or diffuser portion which is joined to the pressurized gas chamber housing (or the joint portion of the pressurized gas chamber housing) forms the gap for charging the pressurized gas in the third step, and as a result, the assembly operation is facilitated.

The present invention further relates to the pressurized gas charging method, wherein a cylindrical guide member is disposed so as to surround the pressurized gas chamber housing and one of the unconnected gas generating chamber housing and diffuser portion from the outside before and after the second step, and in the third step, the pressurized gas is charged while controlling the inflow direction of the pressurized gas using the cylindrical guide member.

The widthwise form of the cylindrical guide member is approximately identical to the widthwise form of the pressurized gas chamber housing, and the inner diameter of the cylindrical guide member is approximately identical to the outer diameter of the pressurized gas chamber housing. Note that the opening portion on one end side of the cylindrical guide member (the opening portion on the side which surrounds the pressurized gas chamber housing) may be provided with an inwardly formed flange portion to facilitate gas charging. When the opening portion on one end side of the cylindrical guide member is not provided with a flange portion, gas charging may be facilitated by reducing the diameter of (providing an inward taper on) the opening portion of the pressurized gas chamber housing which faces the opening portion on one end side of the guide member (without the inward flange), at the time of gas charging.

When the cylindrical guide member is used in this manner, the pressurized gas charging operation becomes easier, and hence the time required for assembly can be shortened.

By using the pressurized gas chamber housing and the ignition device accommodating chamber housing in this manner, the need for a gas charging hole and a process for sealing the gas charging hole can be eliminated, and therefore the number of components and operations can be reduced. Moreover, the operation for sealing the gap in the third step may be performed using a conventional assembly line, with no need for an independent process to seal a gas charging hole, and hence the assembly process can be simplified.

The present invention further relates to the pressurized gas charging method, wherein the ignition device accommodating chamber housing has, on a part thereof which serves as a joint portion with the pressurized gas chamber housing, a contact surface which contact with the pressurized gas chamber housing and a non-contact surface which does not contact with the pressurized gas chamber housing, and the non-contact surface forms the gap for charging the pressurized gas in the second step.

The present invention further relates to the pressurized gas charging method, further comprising:

providing a contact surface that contact with the pressurized gas chamber housing and a non-contact surface that does not contact with the pressurized gas chamber housing, in one of the gas generating chamber housing and the diffuser portion, on a part thereof which serves as a joint portion with the pressurized gas chamber housing, wherein charging step further includes, charging the pressurized gas through the gap defined by the non-contact surface.

The non-contact surface may be provided singly or in a plurality. The non-contact surface may be a groove (irregular surface or uneven surface) or the like provided on either the gas generating chamber housing or the ignition device accommodating chamber housing. The depth and width of the groove should be sufficient to allow the pressurized gas charging operation to be performed smoothly, and may be determined in consideration of the number of grooves.

Thus, the non-contact surface on the joint portion of the ignition device accommodating chamber housing which is joined to the pressurized gas chamber housing (or the joint portion of the pressurized gas chamber housing) forms a gap for charging the pressurized gas in the second step, and as a result, the assembly operation is facilitated.

The present invention further relates to the pressurized gas charging method, wherein a cylindrical guide member is disposed so as to surround the pressurized gas chamber housing and the unconnected ignition device accommodating chamber housing from the outside before and after the first step, and in the second step, the pressurized gas is charged while controlling the inflow direction of the pressurized gas using the cylindrical guide member.

The widthwise form of the cylindrical guide member is approximately identical to the widthwise form of the pressurized gas chamber housing, and the inner diameter of the cylindrical guide member is approximately identical to the outer diameter of the pressurized gas chamber housing. Note that the opening portion on one end side of the cylindrical guide member (the opening portion on the side which surrounds the pressurized gas chamber housing) may be provided with an inwardly formed flange portion to facilitate gas charging. When the opening portion on one end side of the cylindrical guide member is not provided with a flange portion, gas charging may be facilitated by reducing the diameter of (providing an inward taper on) the opening portion of the pressurized gas chamber housing which faces the opening portion on one end side of the guide member (without the inward flange), at the time of gas charging.

When the cylindrical guide member is used in this manner, the pressurized gas charging operation becomes easier, and hence the time required for assembly can be shortened.

In this pressurized gas charging method, the gas generating chamber housing does not include an ignition device (electric igniter, gas generating agent, and so on) when the pressurized gas is charged, the ignition device being disposed after the pressurized gas is charged.

In this charging method, the pre-assembly gas generator is disposed in a sealed space having an identical charging pressure and identical pressurized gas compositional ratio to that of the pressurized gas chamber housing after being filled. Accordingly, identical pressure environments are formed on the interior and exterior of the pressurized gas chamber housing, and hence there is no need to generate excessive pressure during charging. Moreover, the need for extreme pressure to hold together the unconnected pressurized gas chamber housing and the diffuser portion or gas generating chamber housing is eliminated, and therefore the charging time can be shortened.

According to the gas generator and pressurized gas charging method of the present invention, a conventional charging hole and a conventional process for sealing the charging hole using a sealing pin are not necessary. Moreover, the gas charging process may be included in the component assembly and welding processes of a typical manufacturing line, and therefore the assembly process can be simplified.

The present invention relates to a method of charging gas into a gas generator that is suitable for use in an air bag system or the like, which is installed in an automobile, for restraining passengers and protecting pedestrians.

EMBODIMENTS OF THE INVENTION

<Gas Generator-1>

Figure 1:
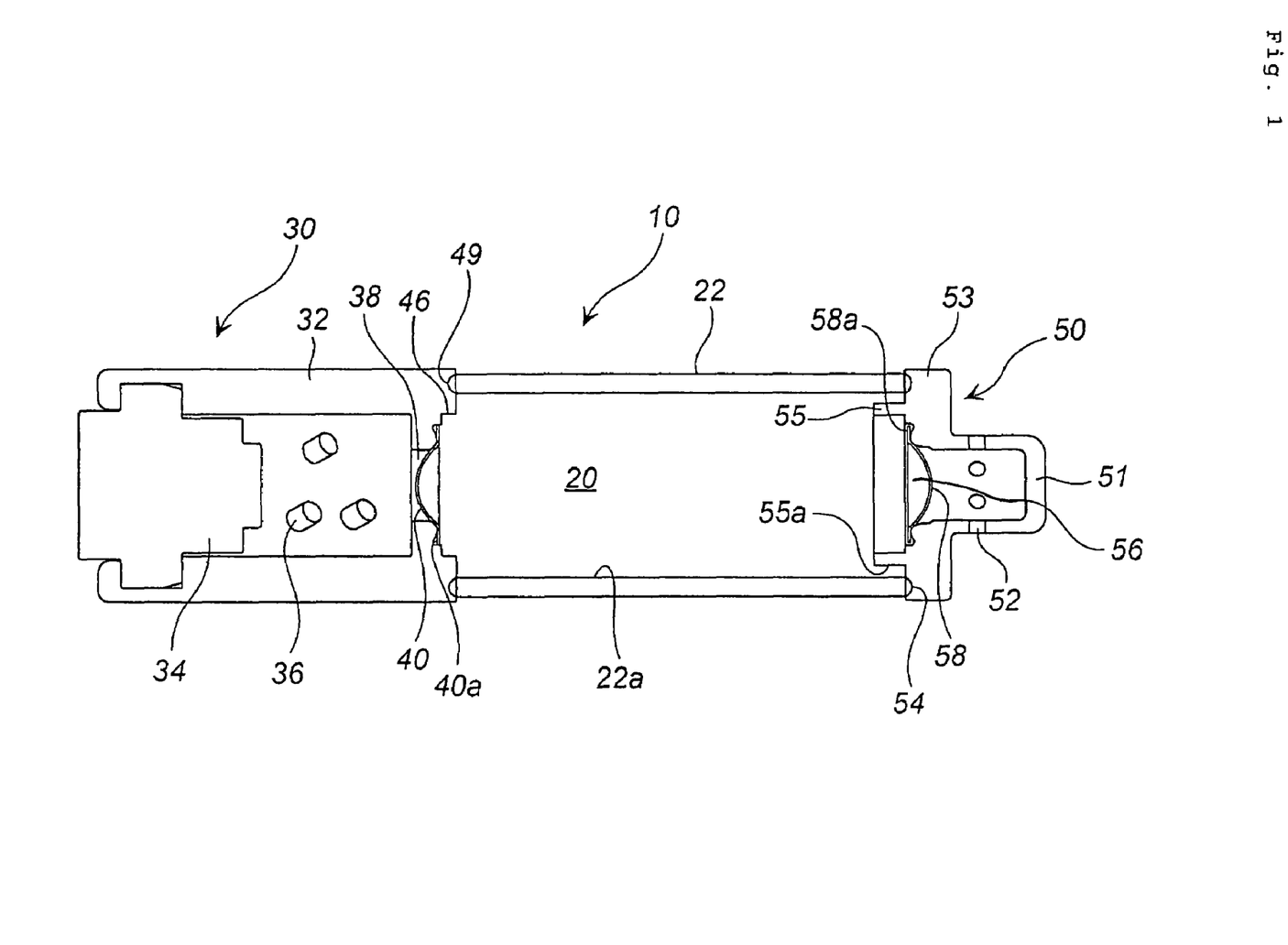
FIG. 1 shows a longitudinal sectional view of a gas generator.

First, a gas generator to which the pressurized gas charging method of the present invention is applied will be described using the drawings. FIG. 1 is an axial sectional view of a gas generator 10.

The gas generator 10 includes a pressurized gas chamber 20, a gas generating chamber 30, and a diffuser portion 50. These components have matching axial sectional forms which are preferably circular, but may also be elliptical, polygonal, or another form.

The outer shell of the pressurized gas chamber 20 is formed by a cylindrical pressurized gas chamber housing 22 into which a pressurized gas containing a mixture of argon, helium, and so on is charged (at a charging pressure of approximately 30,000 to 67,000 kPa).

The pressurized gas chamber housing 22 is symmetrical in the axial and radial directions, and hence there is no need to adjust the orientation of the pressurized gas chamber housing 22 in the axial and radial directions during assembly. The pressurized gas chamber housing 22 is not provided with a pressurized gas charging hole, such as that provided, prior to assembly, in a conventional gas generator using pressurized gas, and hence there is no need for an independent gas charging hole sealing process such as that required during the assembly of a conventional gas generator having a gas charging hole.

The gas generating chamber 30 includes an ignition device (only an electric igniter or a combination of an electric igniter and a gas generating agent or the like) 34 and a gas generating agent 36, which are accommodated inside a gas generating chamber housing 32, and the chamber 30 is connected to one end side of the pressurized gas chamber 20. The gas generating chamber housing 32 is joined to the pressurized gas chamber housing 22 by resistance welding at a joint portion 49.

The gas generating agent 36 may contain 34% by mass of nitroguanidine as a fuel, 56% by mass of strontium nitrate as an oxidant, and 10% by mass of sodium carboxymethyl cellulose as a binder (with a discharge gas temperature between 700 and 1630° C.), for example. The combustion residue generated upon combustion of the gas generating agent 36 having this composition is strontium oxide (with a melting point of 2430° C.). Accordingly, the combustion residue does not melt, but instead hardens into lump form (slag form).

A first communication hole 38 between the pressurized gas chamber 20 and gas generating chamber 30 is sealed by a first rupturable plate 40 which is deformed into a bowl shape by the pressure of the pressurized gas, and thus the interior of the gas generating chamber 30 is held at normal pressure. The first rupturable plate 40 is joined to the gas generating chamber housing 32 by resistance welding at a peripheral edge portion 40*a*.

The diffuser portion 50, having gas discharging holes 52 for discharging pressurized gas and combustion gas, is connected to the other end side of the pressurized gas chamber 20. The diffuser portion 50 includes a cap portion 51 having the plurality of gas discharge ports 52, a flange portion 53 provided at an opening portion of the cap portion 51, and an annular protruding portion 55 extending from the flange portion 53. If necessary, a filter formed from wire mesh or the like may be disposed in the diffuser portion 50 (cap portion 51) to trap the combustion residue.

The diffuser portion 50 and pressurized gas chamber housing 22 are joined by resistance welding at a joint portion 54 between the flange portion 53 and the opening portion of the pressurized gas chamber housing 22. Note that the annular protruding portion 55 exists in the interior of the pressurized gas chamber housing 22, and an outer peripheral surface 55a thereof does not contact an inner wall surface 22a of the pressurized gas chamber housing 22 such that an annular gap is formed between the outer peripheral surface 55a and the opposing inner wall surface 22a.

A second communication hole 56 between the pressurized gas chamber 20 and diffuser portion 50 is sealed by a second rupturable plate 58, which is deformed into a bowl shape by the pressure of the pressurized gas, and thus the interior of the diffuser portion 50 is held at normal pressure. The second rupturable plate 58 is joined to the diffuser portion 50 by resistance welding at a peripheral edge portion 58a.

<Gas Charging Method-1 for Gas Generator-1>

Figure 2:
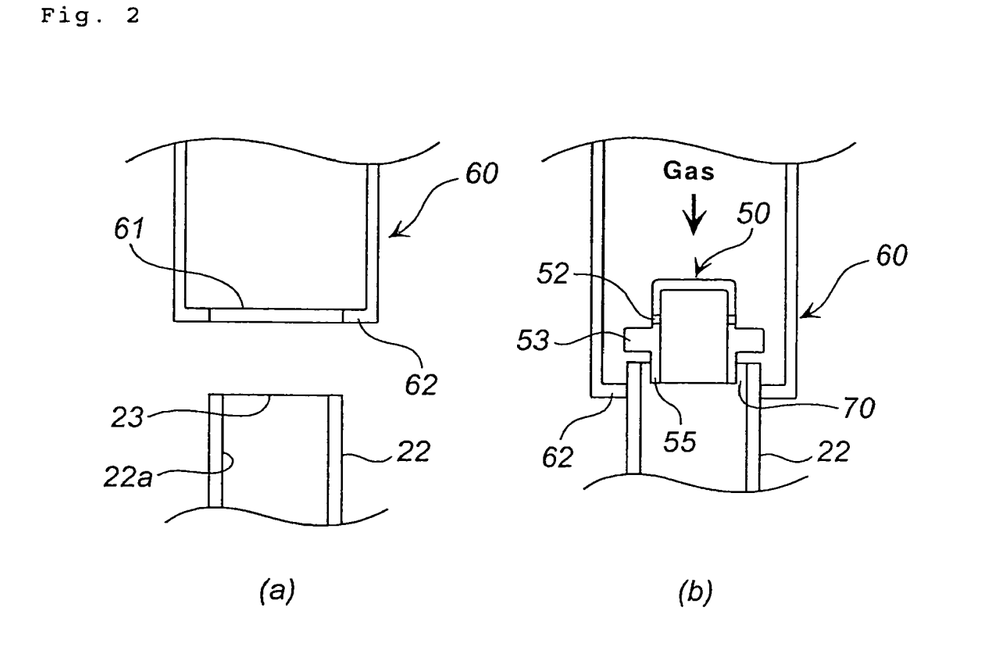
Figure 3:
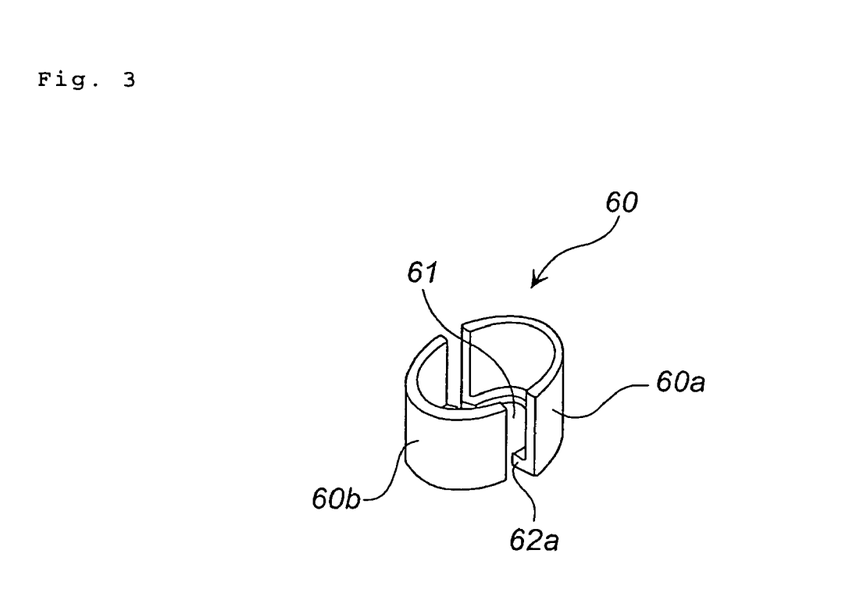
FIG. 3 shows a perspective view of a guide member used in the pressurized gas charging method.
Figure 4:
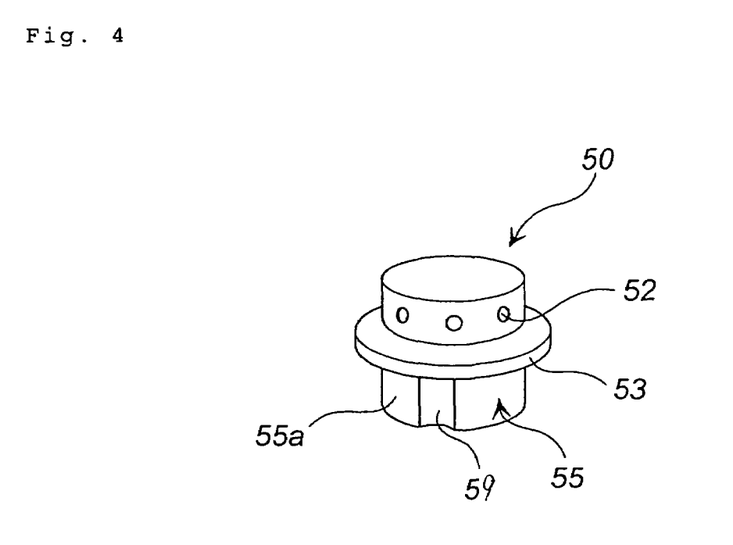
FIG. 4 shows a perspective view of a diffuser portion used in the pressurized gas charging method.
Figure 5:
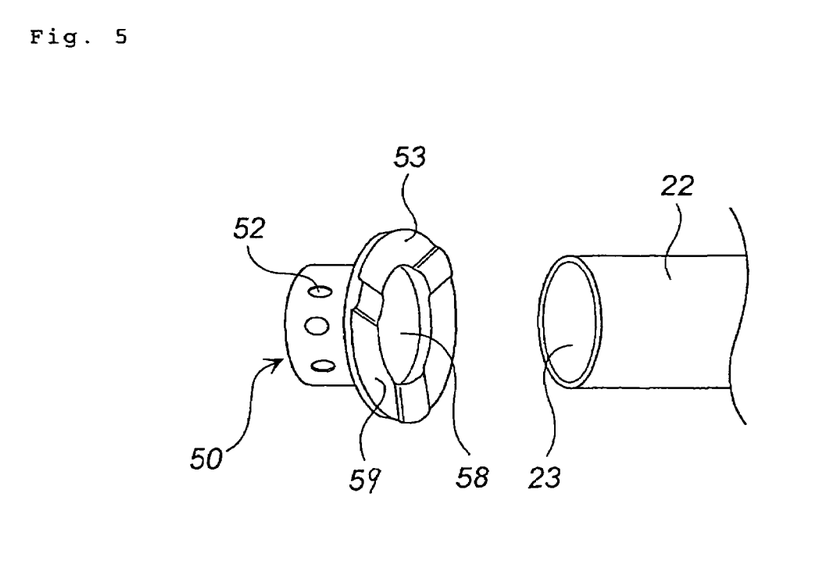
FIG. 5 shows an illustrative view of a pressurized gas charging method.

Next, each step of a pressurized gas charging method for charging pressurized gas into the inflator 10 shown in FIG. 1 will be described using FIGS. 1 through 5. FIGS. 2(a) and (b) are illustrative views of the gas charging method, FIG. 3 is a perspective view showing another embodiment of a guide member 60 used in FIG. 2, FIG. 4 is a perspective view showing another embodiment of the diffuser portion 50 used in FIG. 2, and FIG. 5 is an illustrative view of a gas charging method employing another embodiment of the diffuser portion 50 used in FIG. 2.

In a first step, the gas generating chamber housing 32 is brought into contact with the opening portion at one end of the pressurized gas chamber housing 22, which has opening portions at both ends, and by performing resistance welding at the joint portion 49, this opening portion at one end of the pressurized gas chamber housing 22 is sealed. Here, the first communication hole 38 in the gas generating chamber housing 32 is sealed in advance by the first rupturable plate 40. Note that the first rupturable plate 40 does not yet receive pressure, and therefore takes a flat plate form rather than being deformed into the bowl shape shown in FIG. 1.

Next, in a second step, the guide member 60 is fitted over and attached to an opening portion 23 on the opposite side of the pressurized gas chamber housing 22, as shown in FIGS. 2(a) and (b). If necessary, the guide member 60 may be fastened to the opening portion 23 from the outside at this time using an appropriate fastening device.

The guide member 60 has an opening portion at both ends, and the widthwise sectional form thereof matches the widthwise sectional form of the pressurized gas chamber housing 22. An inward flange portion 62 is provided at an opening portion 61 of the guide member 60. The diameter of the opening portion 61 of the guide member 60 is approximately identical to the outer diameter of the pressurized gas chamber housing 22, and therefore the opening portion 61 can be fitted over and attached to the pressurized gas chamber housing 22 as shown in FIG. 2(b).

As shown in FIG. 3, the guide member 60 may be divided into two parts, a main body 60a and a main body 60b, both of which has an inward flange portion 62a and so on. When this type of guide member 60 is used, the pressurized gas chamber housing 22 may be grasped from both sides, and if necessary, the guide member 60 may be fastened to the pressurized gas chamber housing 22 from the outside using an appropriate fastening device.

Note that the opening portion 23 of the pressurized gas chamber housing 22 may take a tapered (inclined in the inside direction) form. By forming the opening portion 23 in a tapered form, the operation to fit the guide member 60 over the opening portion 23 becomes easier. By aligning the inner diameter of the guide member 60 (the inward flange portion 62 is unnecessary in this case) with any outer diameter of the tapered portion and pushing the guide member 60 down in the axial direction of the pressurized gas chamber housing 22, the guide member 60 can be brought into tight contact with the pressurized gas chamber housing 22, thereby eliminating unnecessary gaps (gaps in the gas charging path), and hence gas leakage from the gas charging path can be prevented.

Next, in a third step, the diffuser portion 50 is disposed in the vicinity of the opening portion 23 of the pressurized gas chamber housing 22 so as to form an annular gap 70, as shown in FIG. 2(b), and in a following fourth step, pressurized gas is charged through the annular gap 70. Note that in the diffuser portion 50, the second communication hole 56 is sealed by the second rupturable plate 58.

The diffuser portion 50 has the flange portion 53 and annular protruding portion 55. The outer diameter of the flange portion 53 is set to be approximately identical to the outer diameter of the pressurized gas chamber housing 22, while the outer diameter of the annular protruding portion 55 is set to be smaller than the inner diameter of the pressurized gas chamber housing 22. Hence, when the diffuser portion 50 is disposed in the vicinity of the opening portion 23 of the pressurized gas chamber housing 22 (such that the flange portion 53 is in the vicinity of the opening portion 23), the annular gap 70 serving as a gas charging hole can be formed between the inner wall surface 22a of the pressurized gas chamber housing 22 and the outer peripheral surface 55a of the annular protruding portion 55 (see FIG. 1; the outer peripheral surface serves as a "non-contact surface").

Pressurized gas is supplied from a gas source connected to the opening portion on the other end of the guide member 60 (on the opposite side of the opening portion 61), or through a gas supply pipe connected to the gas source (not shown). The pressurized gas is charged into the interior of the pressurized gas chamber housing 22 through the annular gap 70 until the predetermined charging pressure (30,000 to 67,000 kPa) is reached.

Next, in a fifth step, the flange portion 53 of the diffuser portion 50 is brought into contact with the opening portion 23 of the pressurized gas chamber housing 22 and joined thereto by resistance welding or the like to seal the opening portion 23.

A diffuser portion such as that shown in FIGS. 4 and 5 may be used instead of the diffuser portion 50 shown in FIGS. 1 and 2(b).

The diffuser portion 50 shown in FIG. 4 is provided with a plurality of groove portions 59 on the outer peripheral surface 55a of the annular protruding portion 55. The outer diameter of the annular protruding portion 55 is approximately identical to the diameter of the opening portion 23 of the pressurized gas chamber housing 22, and the groove portions 59 serve as non-contact surfaces. Hence, when the diffuser portion 50 is disposed in the vicinity of the opening portion 23 of the pressurized gas chamber housing 22, the gap 70 serving as a gas charging hole can be formed between the plurality of groove portions 59 and the inner wall surface 22a of the pressurized gas chamber housing 22.

The diffuser portion 50 shown in FIG. 5 has no part that corresponds to the annular protruding portion 55, and the plurality of groove portions 59 (convex portions may be formed instead of groove portions) are provided on the surface of the flange portion 53 which is joined to the opening portion 23 of the pressurized gas chamber housing 22. Thus the groove portions 59 serve as non-contact surfaces (when convex portions are provided instead of groove portions, the remaining flat surface portions serve as the non-contact surfaces). By disposing the diffuser portion 50 in the vicinity of, or in contact with (preferably the latter), the opening portion 23 of the pressurized gas chamber housing 22, the gap 70 serving as a gas charging hole can be formed between the plurality of groove portions 59 and the opening portion 23 of the pressurized gas chamber housing 22.

According to this gas charging method, the welding processes and so on of a typical assembly line can be used without modification, and therefore a conventional processes of providing a gas charging hole in the pressurized gas chamber housing 22, charging gas through a gap in the gas charging hole, into which a pin is inserted, fitting the pin perfectly into the gap, and then welding the pin to the pressurized gas chamber housing 22, are no longer necessary. As a result, the number of components can be reduced and the assembly process can be simplified.

<Gas Charging Method-2 for Gas Generator-1>

Figure 6:
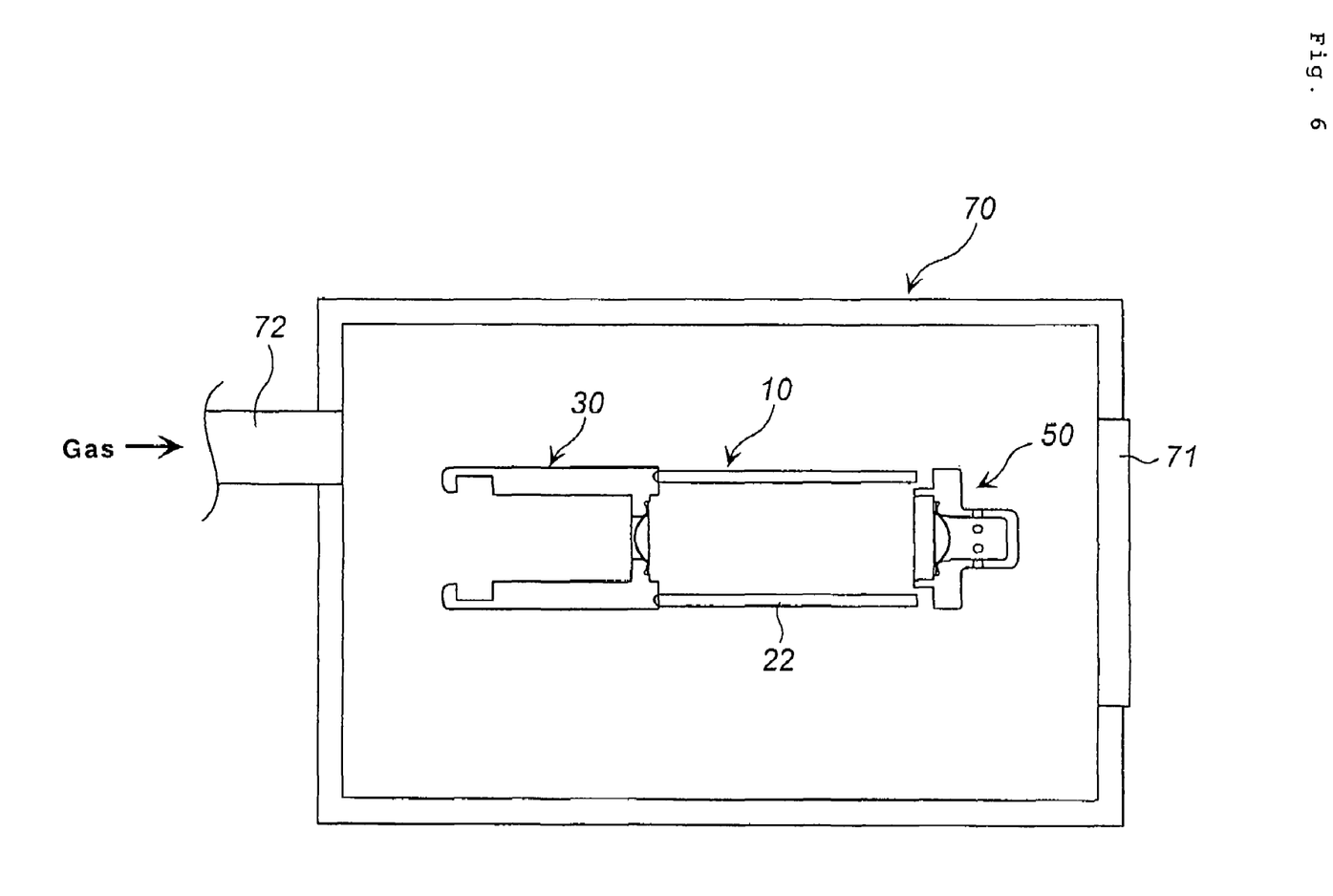
FIG. 6 shows an illustrative view of a pressurized gas charging method.

Next, each step of a pressurized gas charging method for charging pressurized gas into the inflator 10 shown in FIG. 1 will be described using FIG. 6. FIG. 6 is an illustrative view of this gas charging method.

First, in a first step, similarly to the gas charging method-1 described above, the gas generating chamber housing 32 is brought into contact with an opening portion at one end of the pressurized gas chamber housing 22, which has opening portions at both ends. Resistance welding is then performed at the joint portion 49 to seal this opening portion at one end of the pressurized gas chamber housing 22.

Next, a lid portion 71 of a closed container 70 is opened, and the joined pressurized gas chamber housing 22 and gas generating chamber housing 32 are inserted into the closed container 70 and fixed from the outside by a maneuverable mechanical device. Simultaneously, the diffuser portion 50 is also inserted into the closed container 70 and fixed from the outside by the maneuverable mechanical device into a position directly opposing the opening portion 23 of the pressurized gas chamber housing 22. The lid portion 71 is then closed, thereby sealing the sealed container 70 from the external atmosphere.

Next, in a second step, charging gas is supplied through a gas supply pipe 72, which connects an external gas source (not shown) to the sealed container 70, and maintained at a predetermined pressure (the gas charging pressure of the gas generator; approximately 30,000 to 67,000 kPa). At this time, the igniter 34 and gas generating agent 36 are not present in the gas generating chamber 30, and therefore the interiors of the pressurized gas chamber housing 22, gas generating chamber housing, and diffuser portion 50 all reach the predetermined pressure. Note that an open/close valve is provided between the gas supply pipe 72 and gas source, and by manipulating this open/close valve, the gas supply pipe 72 can be also used as a gas exhaustion pipe.

Next, in a third step, the opening portion 23 of the pressurized gas chamber housing 22 is brought into contact with the diffuser portion by means of an operation performed on the exterior of the sealed container 70, whereupon resistance welding is performed by causing an electric current to flow into the contact portion.

Surplus gas is then extracted through the gas supply pipe 72 until the pressure in the sealed container 70 falls to normal pressure, and then the gas generator 10 is removed. At this time, the interior of the diffuser portion 50 is also at normal pressure.

According to this charging method, in addition to the effects obtained with the gas charging method-1, the interior and exterior of the pressurized gas chamber housing 22 are in identical pressure environments, and hence there is no need to generate excessive pressure during charging. Great pressure is also not required when pushing the diffuser portion 50 onto the opening portion of the pressurized gas chamber housing 22, and therefore the charging time can be shortened. After charging the gas in this manner, the gas generator 10 is removed from the sealed container 70, and a predetermined ignition device is mounted in the interior of the gas generating chamber 30.

<Gas Generator-2>

Figure 7:
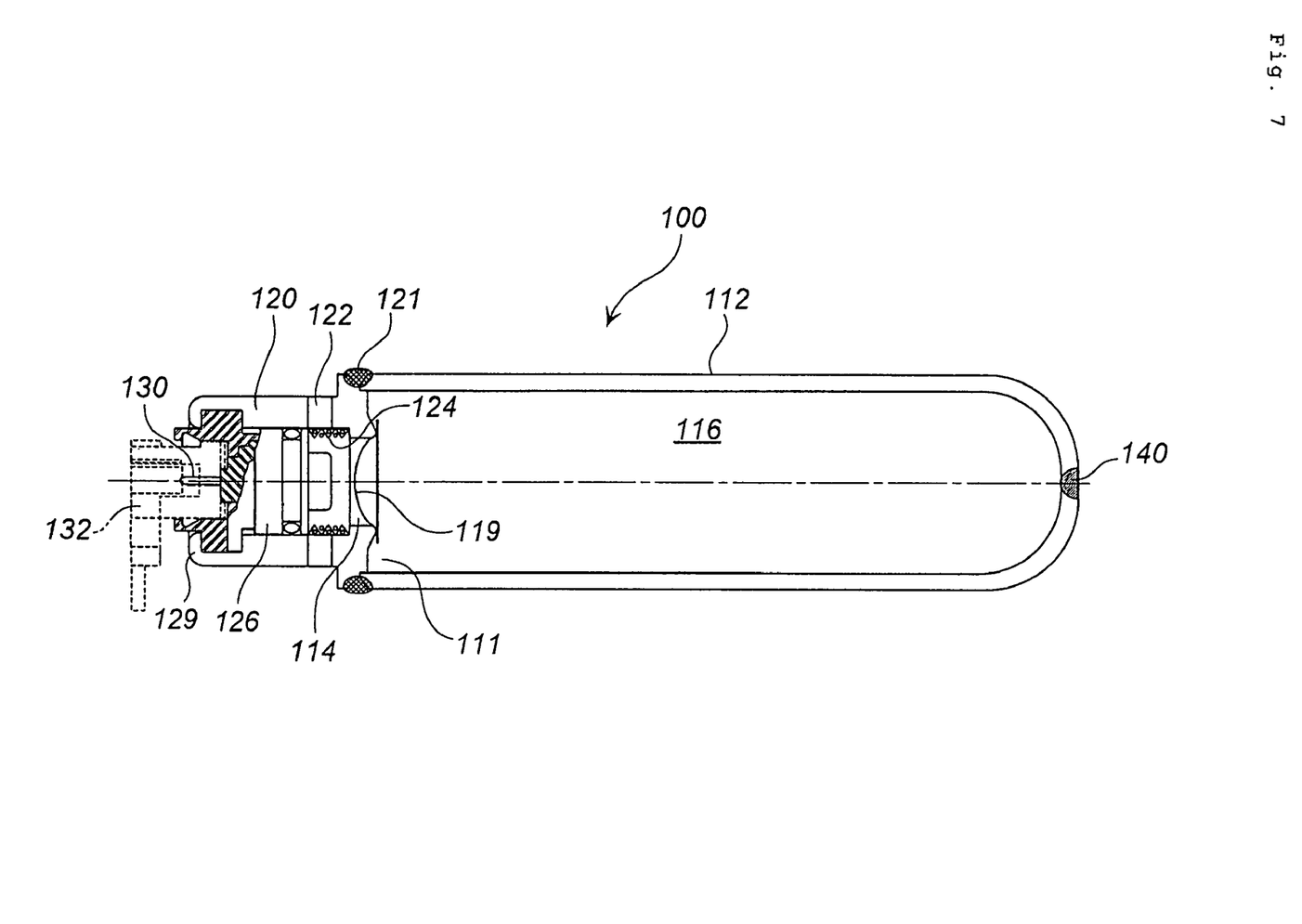
FIG. 7 shows a longitudinal sectional view of a gas generator in another embodiment.

Next, another embodiment of a gas generator 100 (a curtain inflator) to which the pressurized gas charging method of the present invention is applied will be described using the drawing. FIG. 7 is a sectional view in the length direction of the gas generator 100 according to the present invention.

A pressurized gas chamber housing 112 has an opening portion 111 at one end side, and another end side 140 is sealed. An interior space 116 is charged with a pressurized medium including only an inert gas having a sound velocity of not less than 400 m/sec. at 0° C. at 1013.25 hPa. Note that the widthwise cross-section of the pressurized gas chamber housing 112 is circular, and the opening portion 111 takes a similar circular form. Also note that the other end side 140 is sealed in advance using a Mannesmann process or the like, but may be sealed using a separate member.

An ignition device accommodating chamber housing 120 is fixed to the opening portion 111 of the pressurized gas chamber housing 112. An igniter 126 is stored in the interior of the ignition device accommodating chamber housing 120, and a plurality of gas discharge ports 122 are formed in a peripheral wall portion thereof. During an operation, the pressurized gas that flows out of the opening portion 111 is discharged to the outside through the gas discharge ports 122. 124 denotes a filter made of metal gauze.

A communication hole 114 communicating with the interior space is also formed in the ignition device accommodating chamber housing 120, and prior to an operation, this communication hole 114 is sealed by a rupturable plate 119. As a result, the interior space 116 of the pressurized gas chamber housing 112 is maintained in a high-pressure, airtight state, and the interior of the ignition device accommodating chamber housing 120 is at normal pressure. The igniter 126 is inserted into the ignition device accommodating chamber housing 120 and then fixed thereto by caulking an end portion 129. 130 denotes a conductive pin extending from the igniter 126, and 132 denotes a connector for transmitting an ignition current to the conductive pin 130.

Next, an operation performed upon activation of the gas generator 100 will be described. When installed in a vehicle, the gas generator 100 is provided in a system combining an activation signal output device including a impact sensor and a control unit, a module case accommodating the gas generator 100 and a curtain type air bag inside a case, and so on. When the vehicle receives an impact, the gas generator 100 receives a signal from the impact sensor of the system and activates the igniter 126. As a result, the rupturable plate 119 ruptures, thereby opening the opening portion 111.

Pressurized gas then flows through the communication hole 114 and filter 124, and is discharged through the gas discharge ports 122 to inflate the curtain type air bag.

<Gas Charging Method-1 for Gas Generator-2>

Next, a pressurized gas charging method for charging pressurized gas into the gas generator 100 shown in FIG. 7 will be described.

A similar method to that described in <Gas charging method-1 for gas generator-1> may be used as a method for charging pressurized gas into the gas generator 100.

In a first step, the guide member 60 is fitted over the opening portion 111 of the pressurized gas chamber housing 112 in a similar manner to <Gas charging method-1 for Gas generator-1>, as shown in FIGS. 2(a) and (b). The ignition device accommodating chamber housing 120 is then disposed in the vicinity of the opening portion 111 of the pressurized gas chamber housing 112 so as to form the annular gap 70.

The guide member 60 may be divided into two parts, the main body 60a and the main body 60b shown in FIG. 3. Further, as described above, the gas may be charged with the opening portion ill side of the pressurized gas chamber housing 112 formed in a tapered form (a form inclined in the inside direction).

Next, in a second step, pressurized gas is charged through the annular gap 70. Here, the communication hole 114 in the ignition device accommodating chamber housing 120 is sealed in advance by the rupturable plate 119.

The pressurized gas is supplied from a gas source connected to the opening portion on the other end of the guide member 60 or a gas supply pipe connected to the gas source (not shown). The pressurized gas is charged into the interior of the pressurized gas chamber housing 112 through the annular gap 70 until the predetermined charging pressure (30,000 to 67,000 kPa) is reached.

In order to charge the gas, the groove shown in FIG. 4 in the outer peripheral surface of the annular protruding portion or the plurality of grooves 59 shown in FIG. 5 may be formed on, or in the vicinity of, a flange portion 121 of the ignition device accommodating chamber housing 120, which contacts the opening portion 111 of the pressurized gas chamber housing 112.

Next, in a third step, the flange portion 121 of the ignition device accommodating chamber housing 120 is brought into contact with the opening portion 111 of the pressurized gas chamber housing 112 and joined thereto by resistance welding or the like to seal the opening portion 111. The igniter 126 is disposed after gas charging is complete and the pressurized gas chamber housing 112 and ignition device accommodating chamber housing 120 have been joined.

<Gas Charging Method-2 for Gas Generator-2>

The gas generator 100 shown in FIG. 7 may be charged with pressurized gas in a similar fashion to <Gas charging method-2 for gas generator-1>.

In FIG. 6, 22 and 30 correspond respectively to the pressurized gas chamber housing 112 and ignition device accommodating chamber housing 120 shown in FIG. 7, and the gas generator 10 corresponds to the gas generator 100. Hence, the pressurized gas chamber housing 112 and ignition device accommodating chamber housing 120 are inserted into the sealed container 70, the sealed container 70 is sealed from the exterior atmosphere, and charging gas is introduced until the interior of the container 70 reaches a predetermined pressure (the gas charging pressure of the gas generator; approximately 30,000 to 67,000 kPa). The opening portion 111 of the pressurized gas chamber housing 112 is then brought into contact with the ignition device accommodating chamber housing 120 by means of an operation performed on the exterior of the sealed container 70, whereupon resistance welding is performed by causing an electric current to flow into the contact portion. Surplus gas is then extracted through the gas supply pipe 72 until the pressure in the sealed container 70 falls to normal pressure, and then the gas generator 100 is removed.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of charging an interior of a gas generator with a pressurized gas, the gas generator having a pressurized gas chamber having a pressurized gas chamber housing charged with the pressurized gas therein, a gas generating chamber housing connected to a first opening portion of the pressurized gas chamber housing, and a diffuser portion, having a gas discharge port, being connected to a second opening portion of the pressurized gas chamber housing, no charging hole for charging the pressurized gas being provided in the pressurized gas chamber housing before charging the pressurized gas, comprising:

connecting one of the gas generating chamber housing and the diffuser portion to the first opening portion of the pressurized gas chamber housing and sealing the first opening portion;

disposing the gas generating chamber housing or the diffuser portion, that is not connected in the connecting step, in the vicinity of the second opening portion of the pressurized gas chamber housing so as to form a gap serving as a gas charging hole;

providing a contact surface that contacts the pressurized gas chamber housing and a non-contact surface that does not contact the pressurized gas chamber housing, in one of the gas generating chamber housing and the diffuser portion, on a part thereof which serves as a joint portion with the pressurized gas chamber housing, placing the contact surface in contact with the pressurized gas chamber housing and charging the pressurized gas through the gap defined by the non-contact surface up to a predetermined pressure; and attaching and fixing the unconnected gas generating chamber housing or diffuser portion to the pressurized gas chamber housing to seal the gap.

2. The pressurized gas charging method according to claim 1, further comprising:

providing a cylindrical guide member arranged so as to surround the pressurized gas chamber housing and the unconnected gas generating chamber housing or diffuser portion from the outside before and after the disposing step, wherein the charging step includes, charging the pressurized gas while controlling the inflow direction of the pressurized gas using the cylindrical guide member.

3. A method of charging an interior of a gas generator with a pressurized gas, the gas generator having a pressurized gas chamber having a pressurized gas chamber housing, having one end open and an opposite end closed and being charged with the pressurized gas therein, and an ignition device accommodating chamber housing, connected to the opening portion of the pressurized gas chamber housing and being provided with a pressurized gas discharge port, no charging hole for charging the pressurized gas being provided in the pressurized gas chamber housing before charging the pressurized gas, comprising:

disposing the ignition device accommodating chamber housing in the vicinity of the opening portion of the pressurized gas chamber housing so as to form a gap serving as a gas charging hole;

providing a cylindrical guide member arranged so as to surround only said one open end of the pressurized gas chamber housing and the unconnected ignition device accommodating chamber housing from the outside and to be in tight contact with the pressurized gas chamber housing, charging the pressurized gas while controlling the inflow direction of the pressurized gas using the cylindrical guide member through the gap up to a predetermined pressure; and connecting the unconnected ignition device accommodating chamber housing to the pressurized gas chamber housing to seal the gap.

4. The pressurized gas charging method according to claim 3, wherein the ignition device accommodating chamber housing has, on a part thereof which serves as a joint portion with the pressurized gas chamber housing, a contact surface which contacts the pressurized gas chamber housing and a non-contact surface which does not contact the pressurized gas chamber housing, and the non-contact surface forming the gap for charging the pressurized gas in the charging step.

5. A method of charging an interior of a gas generator with a pressurized gas, the gas generator having a pressurized gas chamber having a pressurized gas chamber housing charged with the pressurized gas therein, a gas generating chamber housing connected to a first opening portion of the pressurized gas chamber housing, and a diffuser portion having a gas charge port, being connected to a second opening portion of the pressurized gas chamber housing, no charging hole for charging the pressurized gas being provided in the pressurized gas chamber housing before charging the pressurized gas, comprising:

disposing an assembly formed by connecting one of the gas generating chamber housing and the diffuser portion to the first opening portion of the pressurized gas chamber housing, thereby sealing the first opening portion, in a sealed chamber to which a pressurized gas supply device is annexed;

providing a contact surface that contacts the pressurized gas chamber housing and a non-contact surface that does not contact the pressurized gas chamber housing, in one of the gas generating chamber housing and the diffuser portion that is not connected into the disposing step, on a part thereof which serves as a joint portion with the pressurized gas chamber housing, placing the contact surface in contact with the pressurized gas chamber housing for forming a gap serving as a gas charging hole and raising the internal pressure of the sealed chamber to a predetermined pressure thereby introducing the pressurized gas into the pressurized gas chamber housing through the gap defined; and connecting the unconnected gas generating chamber housing or diffuser portion to the pressurized gas chamber housing to seal the opening portion.

* * * * *